US012112868B2

(12) United States Patent
Lee et al.

(10) Patent No.: US 12,112,868 B2

(45) Date of Patent: Oct. 8, 2024

(54) CABLE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Chun-Lin Lee, New Taipei (TW); Jian-Guo Cai, Kunshan (CN); Juan Zheng, Kunshan (CN); Lu-Yu Chang, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 17/887,696

(22) Filed: Aug. 15, 2022

(65) Prior Publication Data

US 2023/0069746 A1 Mar. 2, 2023

(30) Foreign Application Priority Data

Aug. 25, 2021 (CN) ............................ 202122010474

(51) Int. Cl.

| | |
|---|---|
| ***H01B 7/18*** | (2006.01) |
| ***H01B 7/02*** | (2006.01) |
| ***H01B 11/00*** | (2006.01) |
| ***H01B 11/10*** | (2006.01) |

(52) U.S. Cl.

CPC ............. *H01B 7/18* (2013.01); *H01B 7/0208* (2013.01); *H01B 11/002* (2013.01); *H01B 11/10* (2013.01)

(58) Field of Classification Search

CPC ...... H01B 7/02; H01B 7/0208; H01B 7/0216; H01B 7/0275; H01B 7/04; H01B 7/08; H01B 7/0807; H01B 7/0861; H01B 7/17; H01B 7/18; H01B 7/292; H01B 7/34; H01B 11/02; H01B 11/002; H01B 11/10

USPC ............ 174/36, 102 R, 110 R, 113 R, 117 R, 174/117 M, 117 F, 117 FF

See application file for complete search history.

(56) References Cited

U.S. PATENT DOCUMENTS

| | | | | | |
|---|---|---|---|---|---|
| 3,984,622 | A * | 10/1976 | Ross | H01B 7/0045 | 174/72 A |
| 4,143,236 | A * | 3/1979 | Ross | H01B 7/083 | 174/32 |
| 4,559,411 | A * | 12/1985 | Piper | H01B 7/083 | 29/857 |
| 4,746,769 | A * | 5/1988 | Piper | H01B 11/1033 | 29/857 |
| 4,818,820 | A * | 4/1989 | LaRock | H01B 7/0861 | 174/117 M |
| 5,084,594 | A * | 1/1992 | Cady | H01B 7/0861 | 174/117 M |

(Continued)

FOREIGN PATENT DOCUMENTS

CN 108376580 A * 8/2018 ........... H01B 11/002

*Primary Examiner* — William H. Mayo, III

(74) *Attorney, Agent, or Firm* — Ming Chieh Chang

(57) ABSTRACT

A cable includes: plural cable sets each including a pair of core wires, a shielding layer covering the pair of core wires, and an outer layer covering the shielding layer; and plural fixing wires cross-braided outside the cable sets to keep the cable sets in a row position along a lateral direction.

10 Claims, 11 Drawing Sheets

(56) References Cited

U.S. PATENT DOCUMENTS

| | | | | |
|---|---|---|---|---|
| 5,635,677 | A * | 6/1997 | Wood | H01B 7/083 174/121 R |
| 5,773,762 | A * | 6/1998 | Orr, Jr. | H01B 7/083 174/72 A |
| 6,327,903 | B1 * | 12/2001 | Hecker | B62D 53/0871 73/129 |
| 8,658,899 | B2 | 2/2014 | Gundel | |
| 8,975,521 | B2 * | 3/2015 | Huang | H01B 7/083 174/117 M |
| 10,366,811 | B2 * | 7/2019 | Kobayashi | H01B 11/1008 |
| 2002/0088640 | A1 * | 7/2002 | Schuh | G01K 1/026 374/E1.005 |
| 2004/0026101 | A1 * | 2/2004 | Ochi | H01B 11/1091 174/36 |

* cited by examiner

CABLE

BACKGROUND OF THE INVENTION

1. Field of the Invention

The present invention relates generally to a cable, and more particularly to a cable capable of being integrally terminated.

2. Description of Related Arts

With the development and popularization of electronic technology products, cables are widely used in household appliances, instrumentation, automation equipment, data centers, servers, switches, cloud computing and 5G as a tool for signal transmission. However, in the signal transmission process, the cable is very susceptible to interference from external electromagnetic signals, so it is often necessary to use a structural design of shielding layer to eliminate or reduce the interference of the external electromagnetic field. However, when multiple cables need to be soldered to other component, the shielding layer of each cable needs to be soldered to the corresponding contact parts of component respectively, and the assembly and soldering process is complicated.

Therefore, it is necessary to provide an improved cable that is easy to assemble and solder.

SUMMARY OF THE INVENTION

A main object of the present invention is to provide a cable that is easy to assemble and solder.

To achieve the above-mentioned object, a cable comprises: a plurality of cable sets each including a pair of core wires, a shielding layer covering the pair of core wires, and an outer layer covering the shielding layer; and a plurality of fixing wires cross-braided outside the plurality of cable sets to keep the cable sets in a row position along a lateral direction.

Compared to prior art, the present invention has the advantage that the fixing wires are cross-braided outside the cable sets to fix the cable sets in a row in the lateral direction, so as to facilitate the cutting of the cable and the overall peeling of the outer layer during soldering, and the cable can be soldered at one time, which facilitates subsequent assembling and soldering of the cable.

DETAILED DESCRIPTION OF THE PREFERRED EMBODIMENT

Figure 1:
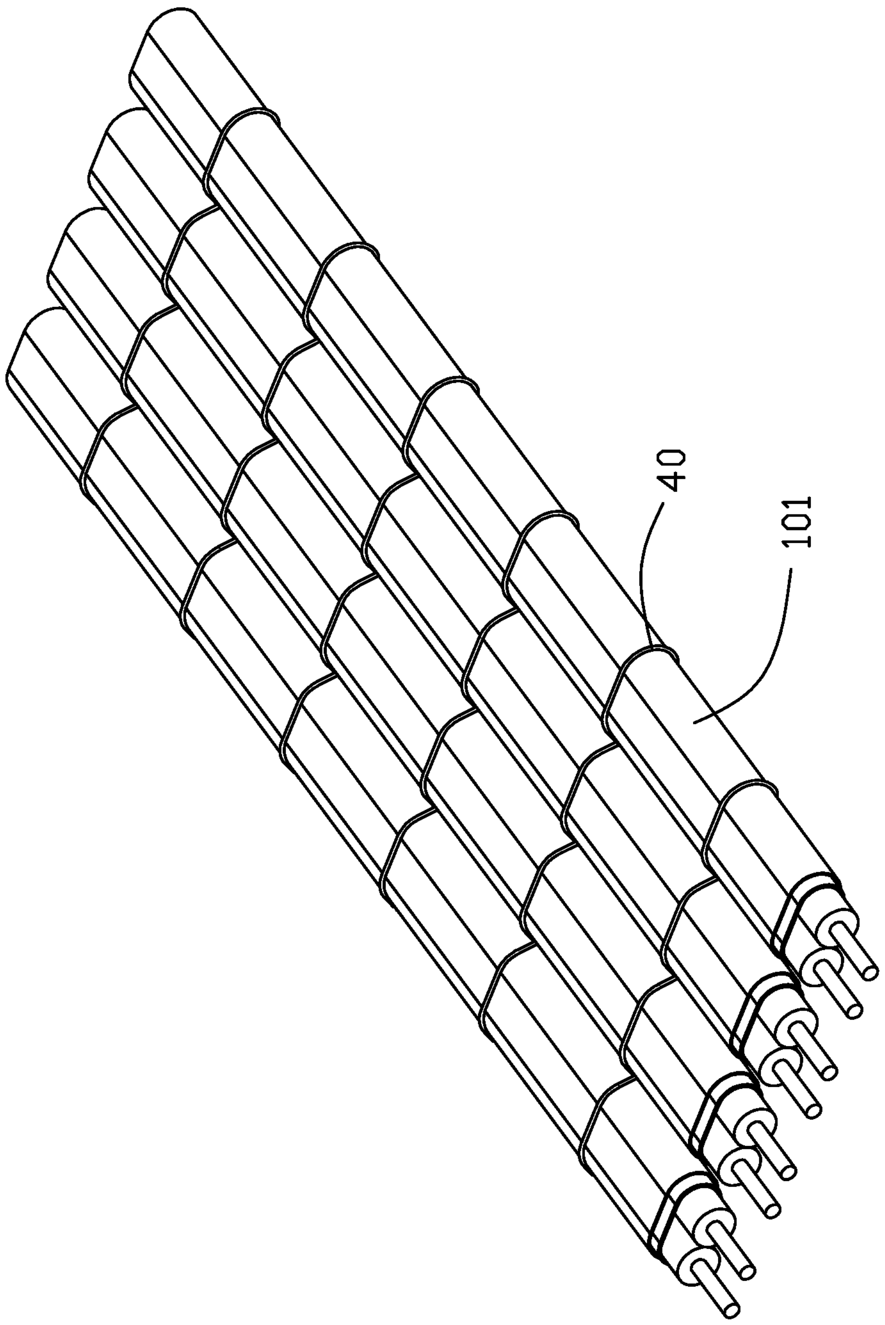
FIG. 1 is a schematic perspective view of a first embodiment of a cable of the present invention.
Figure 2:
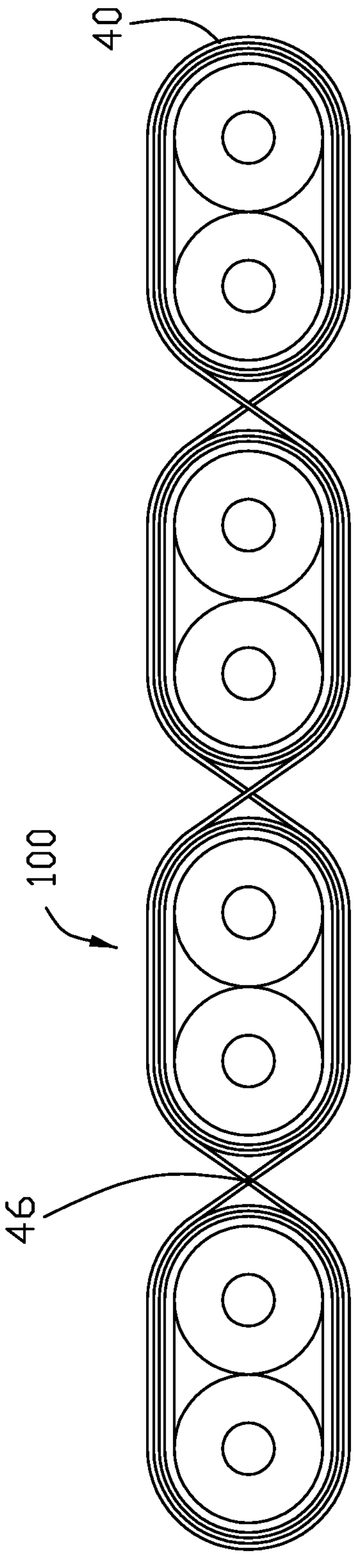
FIG. 2 is a front view of the cable in FIG. 1.
Figure 3:
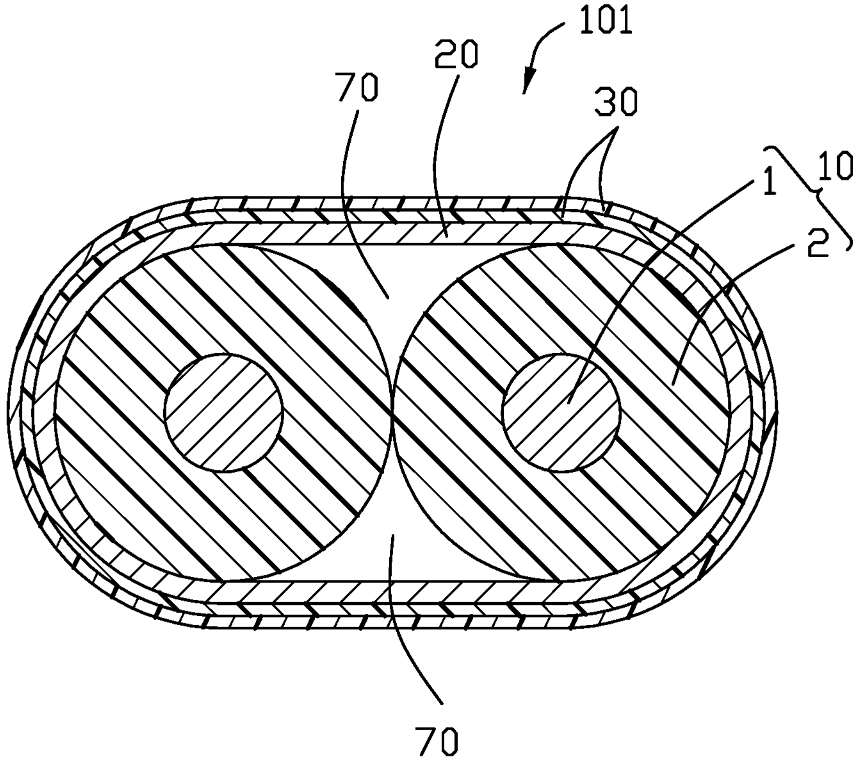
FIG. 3 is a cross-sectional view of the cable set of the cable in FIG. 1.

Referring to FIGS. 1-3, which show the first embodiment of the cable 100 of the present invention. The cable 100 includes a plurality of cable sets 101 and fixing wires 40 cross-braiding outside the cable sets 101. Each of the cable sets 101 includes a core wire 10, a shielding layer 20 covering the core wire 10, and an insulating outer layer 30 covering the shielding layer 20. The fixing wires 40 keep each of the cable sets 101 in position in a row along a lateral direction.

Figure 10:
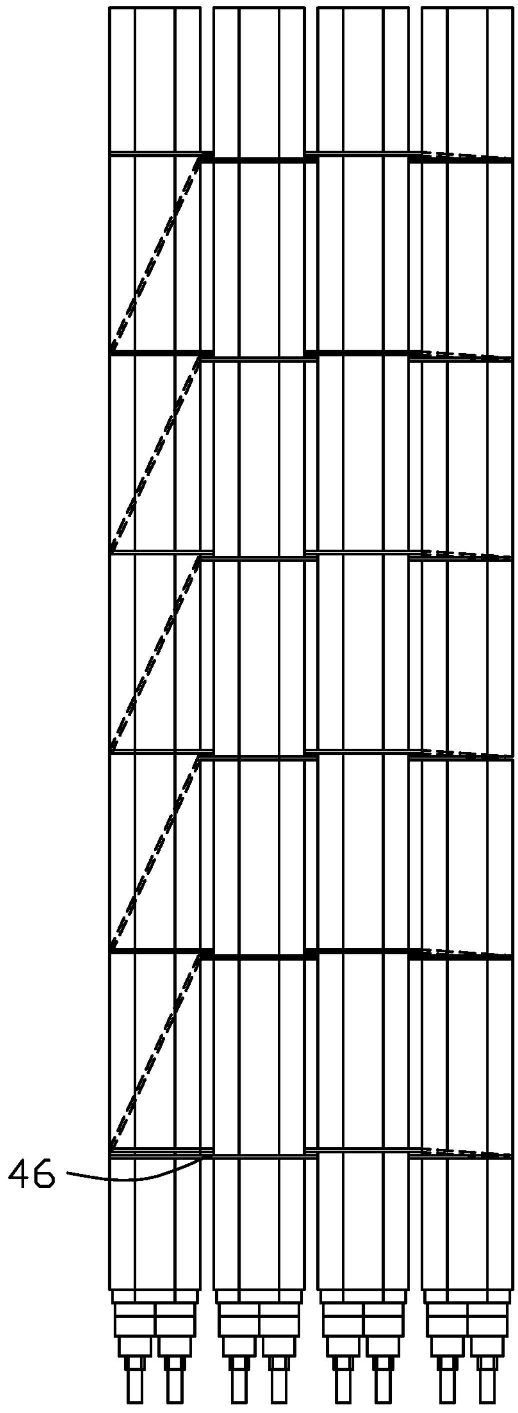
FIG. 10 is a top view of the cable in FIG. 1, showing how the fixing wire is assembled to the cable sets.
Figure 11:
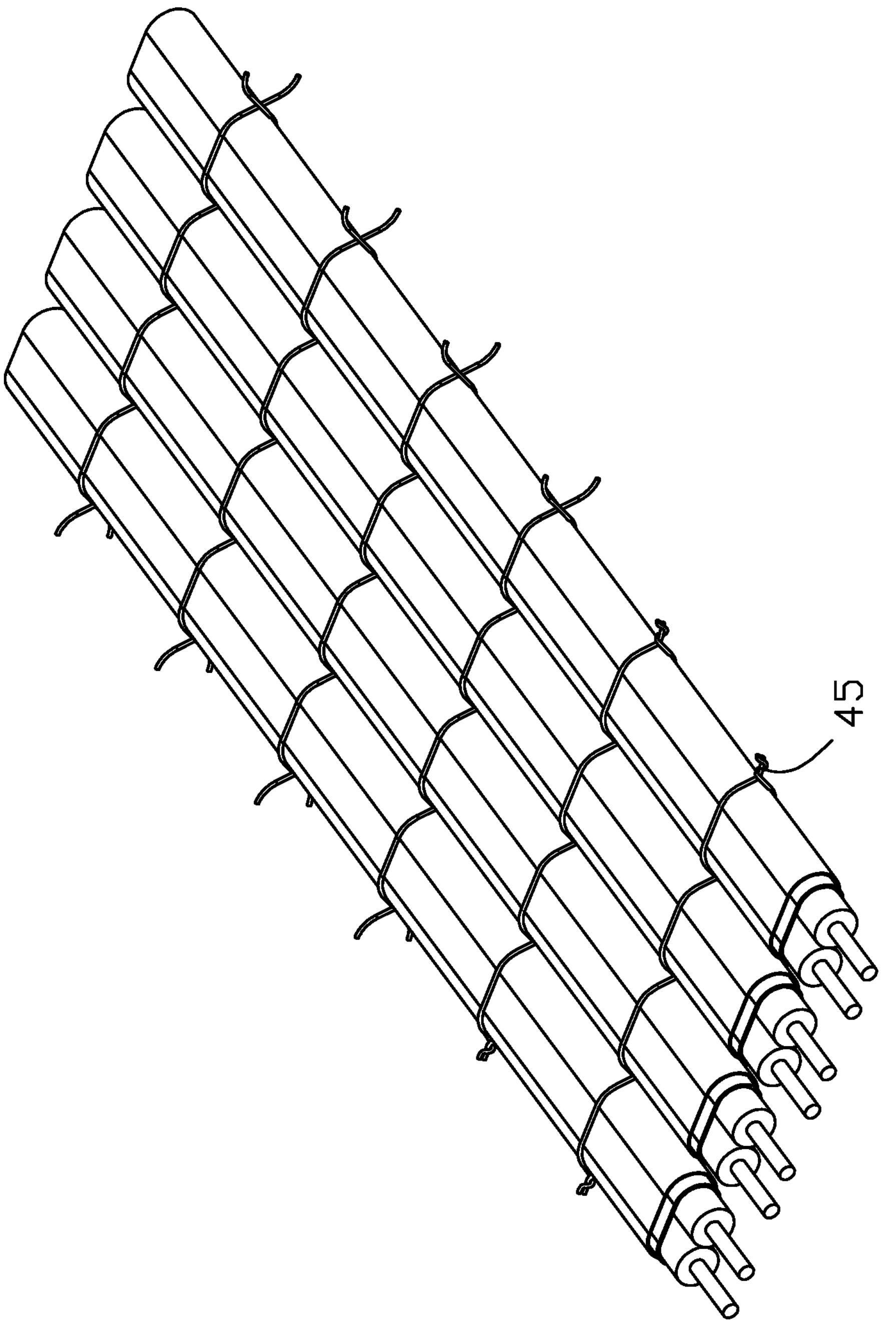
FIG. 11 is a schematic perspective view of another embodiment of how the fixing wire is fixed to the cable sets.

In this embodiment, each cable set 101 includes a pair of the core wires 10. Each of the core wires 10 includes an inner conductor 1 and an inner insulating layer 2 covering the inner conductor 1. The inner conductor 1 is used for transmitting high-speed signal. The inner conductor 1 consists of one conductor. The inner conductor 1 is selected from the group including pure copper conductor, silver-plated copper conductor or tin-plated copper conductor. The inner insulating layer 2 is selected from the group consisting of PP (polypropylene), PE (polyethylene), FEP (Fluorinated ethylene propylene), foamed PP, foamed PE, and foamed FEP. The shielding layer 20 is selected from the group consisting of aluminum foil, pure aluminum tape, double-sided aluminum foil, copper foil, pure copper tape, double-sided copper foil, semiconductor tape, and braided shielding tape. The shielding layer 20 covers the pair of core wires 10 in a longitudinal wrapping manner or in a spiral winding manner. A pair of air gaps 70 are formed on the upper and lower sides between the shield layer 20 and the pair of core wires 10. The insulating outer layer 30 is a wrapping tape made of hot-adhesive PET (polyethylene terephthalate). The insulating outer layer 30 covers the shielding layer 20 in a spiral winding manner or in a longitudinal wrapping manner. The insulating outer layer 30 can be one layer or multiple layers. The fixing wire 40 is soft and easy to bend. The fixing wire 40 can be made of conductive material, such as metal wire, etc. The fixing wire 40 can also be made of non-conductive material, such as a wire made of plastic. Preferably, the fixing wire 40 in the present invention may be stranded and twisted by natural fibers or chemically synthetic fibers. The diameter of the fixing wire 40 can be selected according to actual needs. The cable sets 101 can be fixed with only one fixing wire 40. The fixed wire 40 is cross-braided up and down in the up-down direction perpendicular to the lateral direction on the outside of the cable sets 101, and reciprocates in the lateral direction, which is similar to the principle of weaving cloth. Specifically, as shown in FIG. 10, the fixing wire 40 starts from the underside and is braided from the leftmost cable set 101 to the rightmost cable set 101. At the beginning, the left end of the fixing wire 40 is wound around the leftmost cable set 101 and stick it with glue 46 to fix it, or the left end of the fixing wire 40 can be fixed by knotting a knot 46 instead of gluing, or the left end of the fixed wire 40 may be directly glued to the surface of the leftmost cable set 101 to fix it. As shown in FIG. 11, the cable sets 101 can be fixed with multiple pairs of fixing wires 40, and the respective free ends 45 of the two fixing wires 40 forming a pair can be tied together. In this embodiment, the cable set 101 is not provided with a ground wire.

Figure 4:
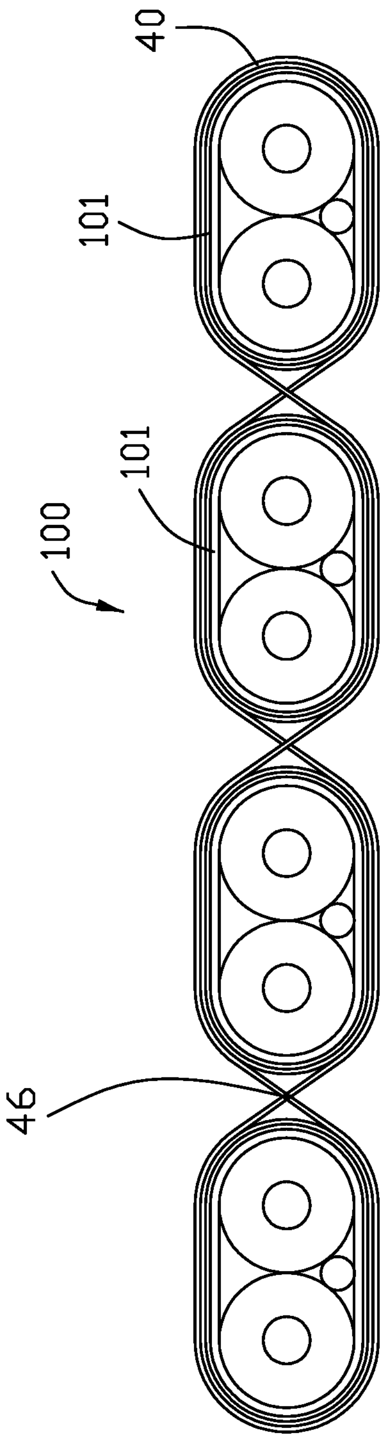
FIG. 4 is a front view of a second embodiment of the cable.
Figure 5:
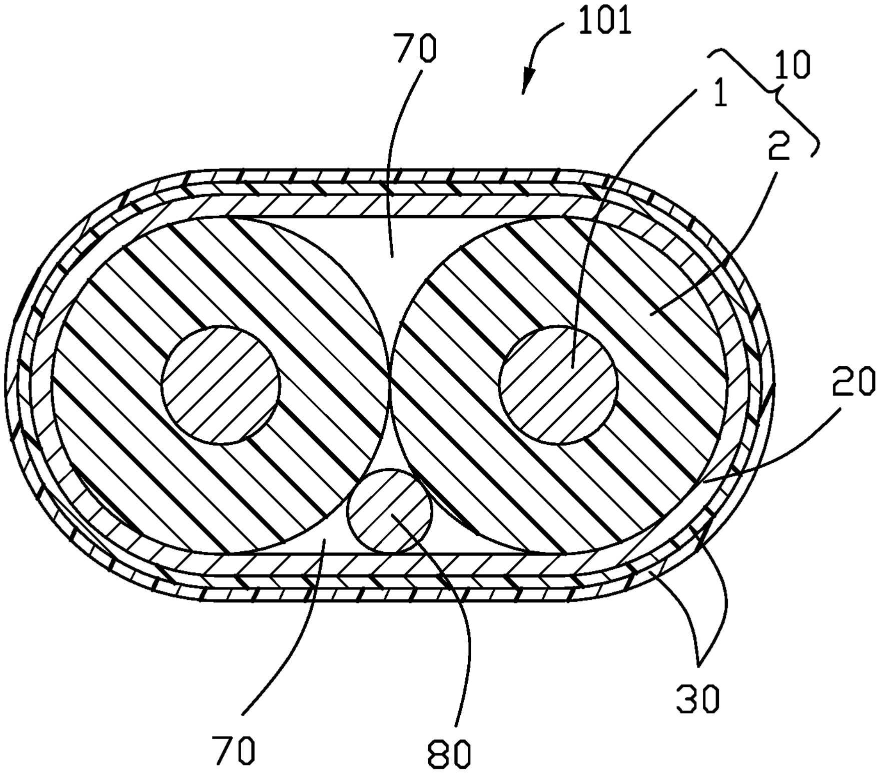
FIG. 5 is a cross-sectional view of the cable in FIG. 4.

Refer to FIGS. 4 and 5, which show the second embodiment of the cable 100 of the present invention. Compared with the first embodiment, in this embodiment, the cable set 101 includes a ground wire 80 disposed in one of the two air gaps 70.

Figure 6:
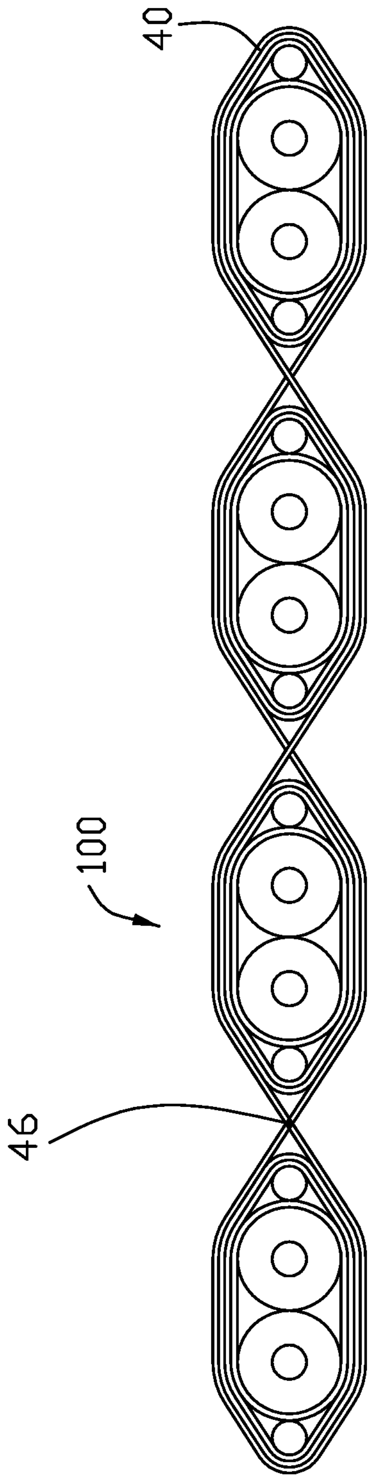
FIG. 6 is a front view of a third embodiment of the cable.
Figure 7:
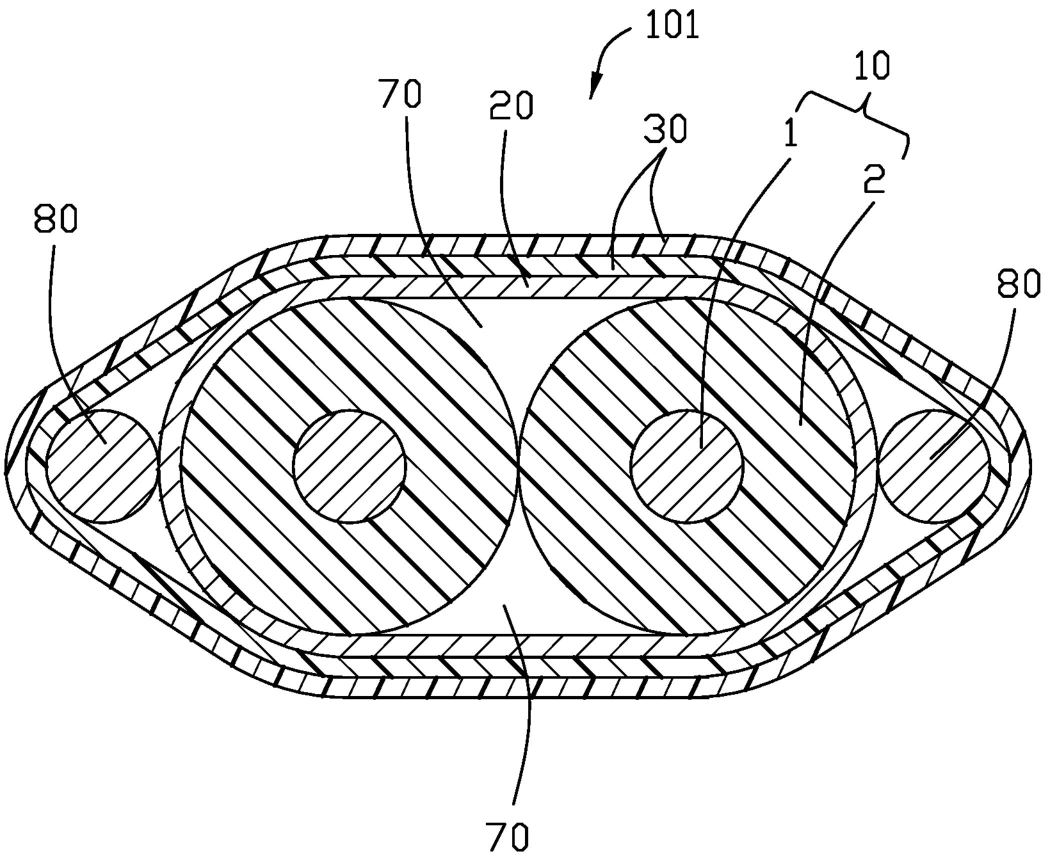
FIG. 7 is a cross-sectional view of the cable in FIG. 6.

Refer to FIGS. 6 and 7, which show the third embodiment of the cable 100 of the present invention. Compared with the first embodiment, in this embodiment, two ground wires 80 are disposed between the core wire 10 and the shielding layer 20, and the two ground wires 80 are located on the left and right sides of the pair of core wires 10.

Figure 8:
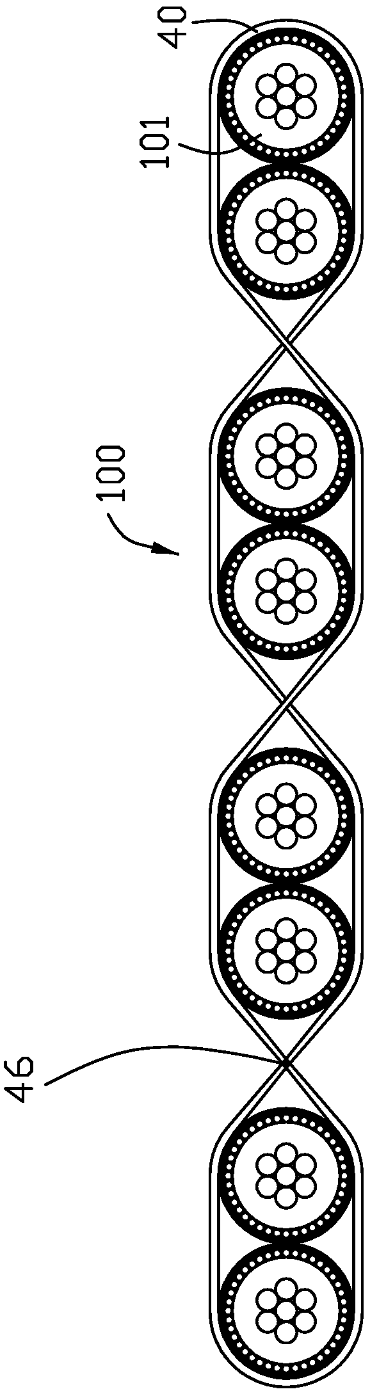
FIG. 8 is a front view of a fourth embodiment of the cable.
Figure 9:
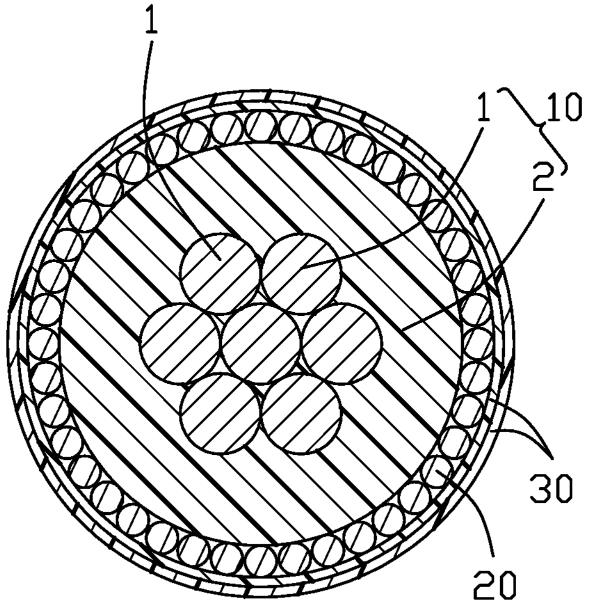
FIG. 9 is a cross-sectional view of the cable in FIG. 6.

Refer to FIGS. 8 and 9, which show the fourth embodiment of the cable 100 of the present invention. Compared with the first embodiment, in this embodiment, the shielding layer 20 is a braided shielding tape. The inner conductor 1 of the core wire 10 is stranded, i.e., composed of small wires bundled or wrapped together to form a larger conductor.

In the present invention, the fixing wires 40 are cross-braided outside the cable sets 101 to fix the cable sets 101 in a row in the lateral direction, so as to facilitate the cutting of the cable 100 and the overall peeling of the outer layer during soldering, and the cable 100 can be soldered at one time, which facilitates assembling and soldering of the cable 100.

What is claimed is:

1. A cable comprising:

a plurality of cable sets each including:

a pair of core wires;

a shielding layer covering the pair of core wires; and an outer layer covering the shielding layer; and a plurality of fixing wires cross-braided outside the outer layers of the plurality of cable sets to keep the cable sets in a row position along a lateral direction.

2. The cable as claimed in claim 1, wherein the fixing wire is twisted by fibers.

3. The cable as claimed in claim 1, wherein the fixing wire is made of non-conductive material.

4. The cable as claimed in claim 1, wherein the fixing wire is made of conductive material.

5. The cable as claimed in claim 4, wherein each of the core wires includes an inner conductor and an insulating layer covering the inner conductor, the inner conductor is composed of a plurality of conductors, the inner conductor is selected from the group consisting of pure copper conductor, silver-plated copper conductor, and tin-plated copper conductor.

6. The cable as claimed in claim 5, wherein the insulating layer is selected from the group consisting of PP, PE, FEP, foamed PP, foamed PE, and foamed FEP.

7. The cable as claimed in claim 1, wherein the shielding layer is selected from the group consisting of aluminum foil, double-sided aluminum foil, copper foil, double-sided copper foil, pure aluminum tape, pure copper tape, semiconductor tape, and braided shielding tape.

8. The cable as claimed in claim 1, wherein the shielding layer covers the pair of core wires in a longitudinal wrapping manner or in a spiral winding manner.

9. The cable as claimed in claim 1, wherein each of the cable sets further comprises one ground wire or two ground wires disposed adjacent to the shielding layer.

10. The cable as claimed in claim 1, wherein the outer layer is a wrapping tape made of hot-adhesive PET.

* * * * *